United States Patent
Cangioli et al.

(10) Patent No.: US 11,859,662 B2
(45) Date of Patent: Jan. 2, 2024

(54) DAMPENED BEARING COMPONENT, BEARING INCLUDING SAID COMPONENT, AND ROTARY MACHINE INCLUDING SAID BEARING

(71) Applicant: NUOVO PIGNONE TECNOLOGIE—S.R.L., Florence (IT)

(72) Inventors: Francesco Cangioli, Florence (IT); Matteo Berti, Florence (IT); Mirko Libraschi, Florence (IT); Leonardo Tognarelli, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 204 days.

(21) Appl. No.: 17/309,989

(22) PCT Filed: Jan. 14, 2020

(86) PCT No.: PCT/EP2020/025012
§ 371 (c)(1),
(2) Date: Jul. 8, 2021

(87) PCT Pub. No.: WO2020/148090
PCT Pub. Date: Jul. 23, 2020

(65) Prior Publication Data
US 2022/0074422 A1    Mar. 10, 2022

(30) Foreign Application Priority Data
Jan. 15, 2019 (IT) .................. 102019000000635

(51) Int. Cl.
*F16C 27/02* (2006.01)
*F04D 29/046* (2006.01)
*F16C 17/10* (2006.01)
*F16C 27/06* (2006.01)
*F16C 33/26* (2006.01)

(52) U.S. Cl.
CPC ............ *F16C 27/02* (2013.01); *F04D 29/046* (2013.01); *F16C 17/10* (2013.01); *F16C 27/063* (2013.01); *F16C 33/26* (2013.01)

(58) Field of Classification Search
CPC ........ F16C 17/02; F16C 17/10; F16C 17/107; F16C 27/02; F16C 27/063; F16C 33/043; F16C 33/26; F16C 2360/44
See application file for complete search history.

(56) References Cited

U.S. PATENT DOCUMENTS

| 1,370,599 A | 3/1921 | Oskar |
| 3,318,642 A | 5/1967 | Peterson |

(Continued)

FOREIGN PATENT DOCUMENTS

| DE | 19701178 A1 | 7/1998 |
| EP | 2899414 A1 | 7/2015 |

(Continued)

*Primary Examiner* — James Pilkington
(74) *Attorney, Agent, or Firm* — Paul Frank + Collins P.C.

(57) ABSTRACT

The bearing component comprises an external cylindrical member having an outer bearing surface and an inner cavity, and internal cylindrical member, arranged in the inner cavity of the external cylindrical member and substantially coaxial thereto. The external cylindrical member and the internal cylindrical member form a gap therebetween. A resilient damping feature is arranged in the gap.

11 Claims, 6 Drawing Sheets

(56) References Cited

U.S. PATENT DOCUMENTS

| | | | |
|---|---|---|---|
| 5,209,577 A | 5/1993 | Swatek | |
| 8,092,092 B2 * | 1/2012 | Barlerin | C23C 8/80 |
| | | | 384/292 |
| 9,562,562 B2 * | 2/2017 | Peterson | F16C 33/043 |
| 11,286,985 B2 * | 3/2022 | Prevost | F16C 27/02 |
| 2017/0159665 A1 | 6/2017 | Bergamini et al. | |
| 2018/0087516 A1 | 3/2018 | Osama et al. | |
| 2019/0186245 A1 * | 6/2019 | Bellmyer | F04D 29/588 |

FOREIGN PATENT DOCUMENTS

| | | |
|---|---|---|
| GB | 988200 A | 4/1965 |
| WO | 2015/114136 A1 | 8/2015 |

\* cited by examiner

DAMPENED BEARING COMPONENT, BEARING INCLUDING SAID COMPONENT, AND ROTARY MACHINE INCLUDING SAID BEARING

TECHNICAL FIELD

The present disclosure concerns improvements to bearings and components thereof. Embodiments disclosed herein concern improvements to bearings and components thereof specifically intended for rotatingly supporting impellers of rotodynamic pumps, such as multi-phase pumps.

BACKGROUND ART

Rotodynamic pumps are used in a variety of applications for transferring energy to a process fluid by means of one or more rotating impeller.

As known to those skilled in the art, dynamic pumps or rotodynamic pumps are machines wherein a fluid is pressurized by transferring kinetic energy, typically from a rotating element such as an impeller, to the fluid being processed through the pump.

Some pumps are designed for processing a multi-phase fluid, containing a liquid and a gaseous phase. Some pumps include embedded electric motors, which rotate each impeller and which can be adapted to control the rotational speed of each impeller independently of the other impellers of the pump, for instance in order to adapt the rotational speed to the actual gas/liquid ratio in each pump stage. Embodiments of multi-phase pumps with embedded electric motors are disclosed for instance in US2017/0159665.

Pump impellers are supported on a stationary shaft by means of bearings, for example polycrystalline diamond (PCD) bearings, which are provided with bearing pads made of or including synthetic diamond. During use, impellers, as well as other rotary machine components, can generate vibrations. These vibrations are transmitted through the bearings to the stationary structure and may propagate from one impeller to other impellers or other machine parts, and may damage the machine.

PCD bearings are particularly rigid and have a small coefficient of friction. These features are beneficial in many applications. However, stiffness of the bearing results in strong vibration propagations from the rotary components to the stationary components of the machine.

A need therefore exists, for improvements in bearings aimed at solving or alleviating the drawbacks of the bearings of the current art, in particular from the point of view of vibration generation and propagation, having particular regard to stiff bearings, such as PCD bearings.

SUMMARY

According to embodiments disclosed herein, a bearing component comprises an external cylindrical member having an outer bearing surface and an inner cavity, and an internal cylindrical member, arranged in the inner cavity of the external cylindrical member and substantially coaxial thereto. The external cylindrical member and the internal cylindrical member form a gap therebetween. A resilient damping feature is arranged in the gap.

The resilient damping feature can include a corrugated laminar member or sheet.

The resilient damping feature reduces the transmission of vibrations from a rotating member, such as an impeller, to a stationery member, such as a supporting shaft of a rotodynamic pump or other rotary machine.

Further features and embodiments of the bearing according to the present disclosure are detailed in the following description and set forth in the appended claims.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

A novel and useful bearing structure has been developed, to improve the dynamic behavior of bearings, such as in particular, but not exclusively, PCD bearings and other bearings characterized by high stiffness. The novel bearings include two components, arranged coaxial to one another. One component rotates integrally with a rotary machine part, such as an impeller of a rotodynamic pump. The other component is stationarily housed in the machine housing. The stationary component includes damping features, which prevent or reduce the propagation of vibrations between the rotary machine component and the stationary structure of the machine.

In embodiments disclosed herein, the stationary component of the bearing includes two co-axial substantially cylindrical members, namely an internal one and an external one. The internal and external members form a gap therebetween. In the gap a resilient damping feature is arranged, which is adapted to allow dampened displacements of the external cylindrical member with respect to the internal cylindrical member. Displacements can be in a radial direction and/or in a tangential direction. Displacements can be provoked by vibrations of a rotary machine component, mounted for integral rotation with the external bearing component. The vibrations propagate through bearing pads from the outer component to the inner component and are dampened by the resilient damping feature arranged in the gap formed in the inner component, between the external cylindrical member and the internal cylindrical member thereof. This results in efficient damping of vibrations and reduced propagation of the vibrations generated by the rotary machine component towards the stationary structure of the machine.

The novel bearing structure will now be described in combination with a rotodynamic pump, and specifically with a multi-phase rotodynamic pump. Those skilled in the art will nevertheless appreciate that the bearing structure of the present disclosure can be used with advantage also in other applications, for instance whenever a relatively stiff bearing is used to support a rotary machine part subject to vibrations and damping of the vibrations is desired.

Figure 1:
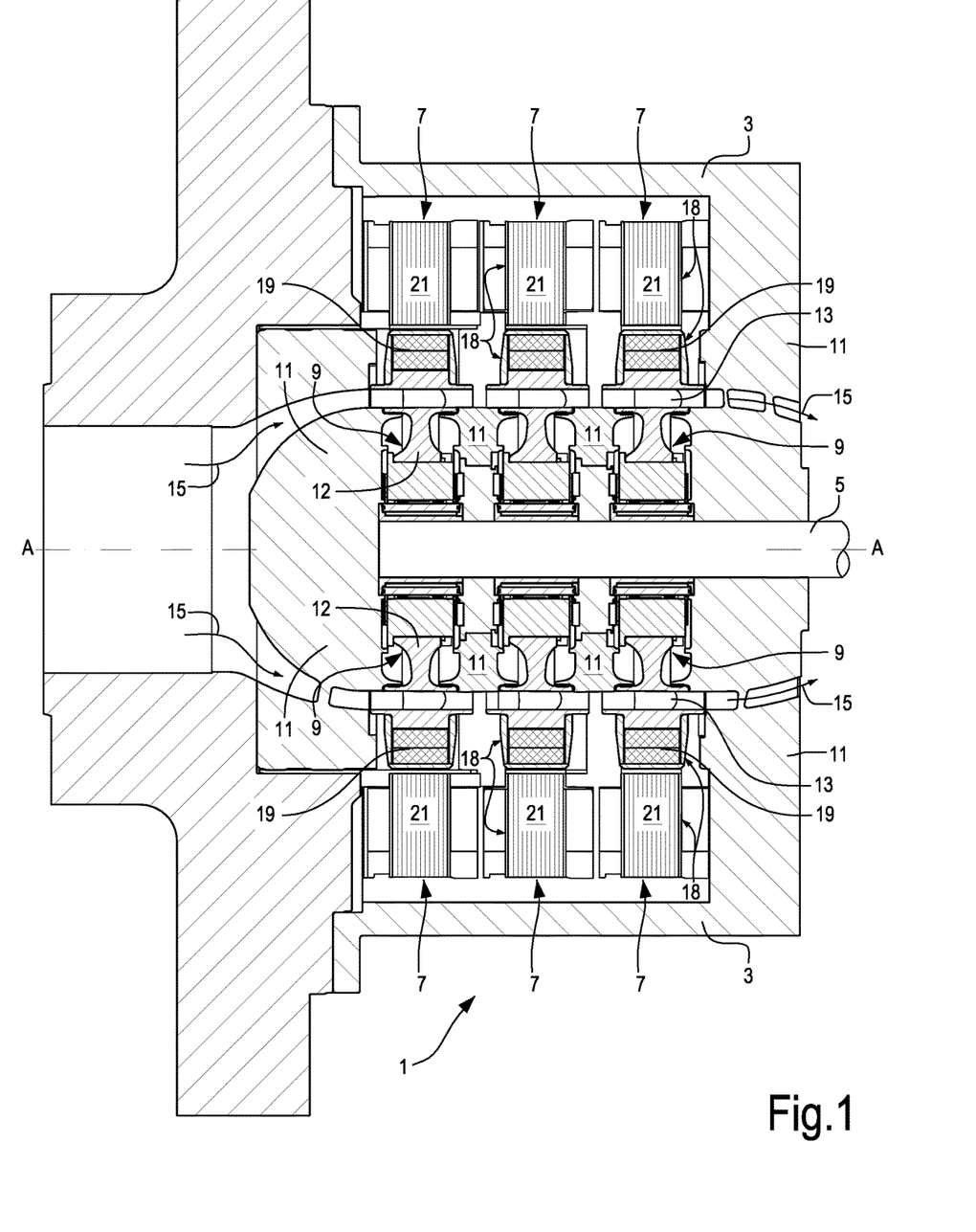
FIG. 1 shows a cross-sectional view of a multi-stage rotodynamic pump including embedded electric motors to drive the pump impellers.

Referring now to FIG. 1, a rotodynamic pump 1 comprises a casing 3 and a stationary shaft 5 arranged therein. The stationary shaft can be formed by a beam extending longitudinally through the pump casing. In other embodiments, the stationary shaft 5 can be comprised of stacked shaft sections connected to one another by an axial tie rod. The pump can comprise a plurality of stages 7. Each pump stage 7 comprises a respective impeller 9, which is supported for rotation on the shaft 5 and coacts with a statoric part 11, i.e. with a non-rotating, stationary component of the pump 1. If the stationary shaft 5 is formed by stacked sections, each impeller 9 can be supported by a separate section of the stationary shaft 5.

Figure 2:
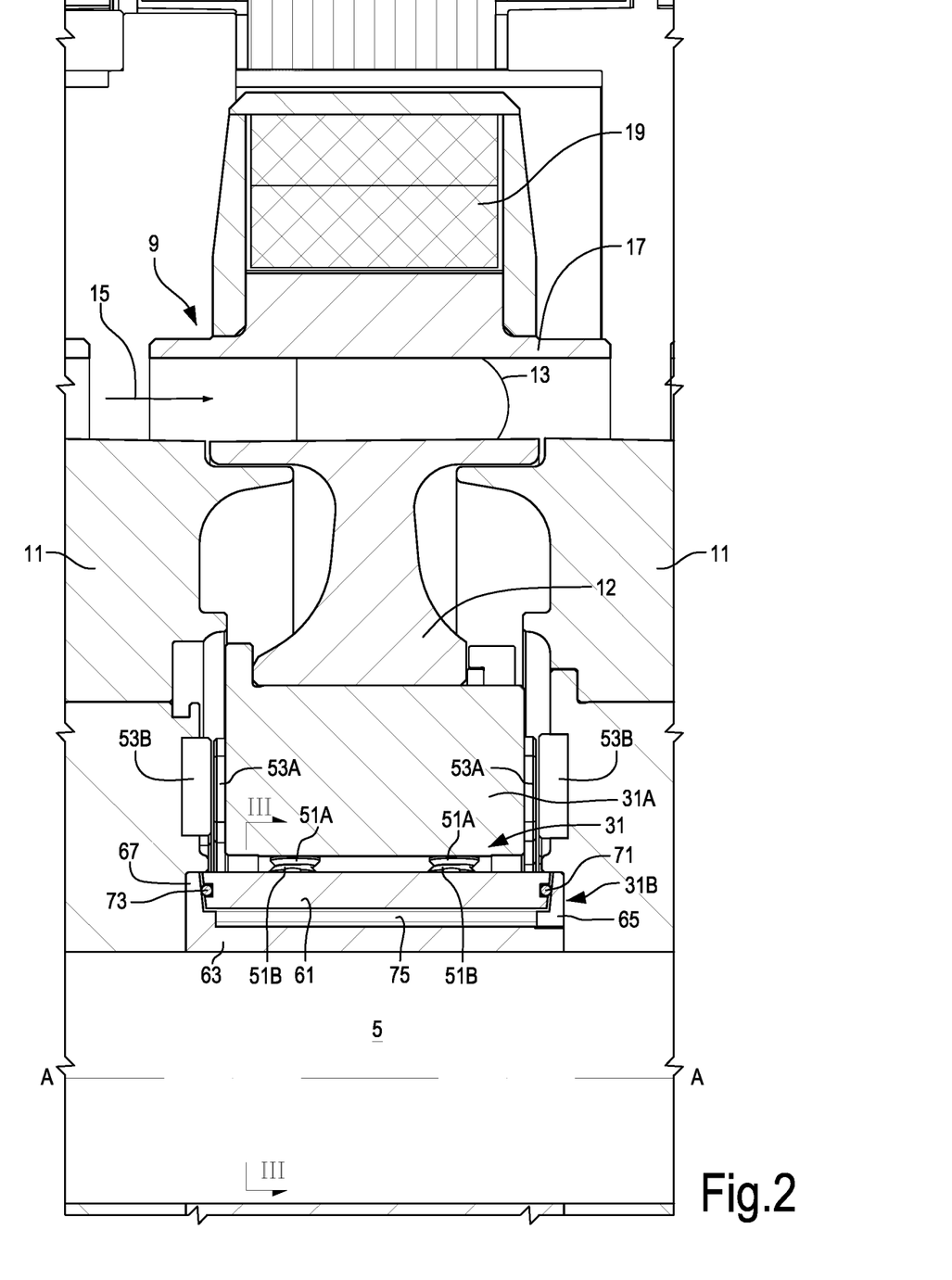
FIG. 2 shows an enlargement of the bearing of one impeller of the pump of FIG. 1 and relevant lubrication circuit.

Referring now to FIG. 2, with continuing reference to FIG. 1, each impeller 9 comprises a disc-shaped body 12 and a plurality of blades 13 distributed annularly around a rotation axis A-A. A process fluid path 15 extends across the bladed portion of each impeller 9. Mechanical power generated by embedded electric motors, to be described, rotate the impellers 9, which transfer the power to the process fluid along the process fluid path 15 to boost the pressure of the fluid.

In the exemplary embodiment of FIGS. 1 and 2, each impeller 9 comprises a shroud 17. Each impeller 9 is driven into rotation by a respective electric motor 18 housed in the casing 3. Each electric motor 18 includes a rotor 19, arranged around the shroud 17 and rotating with the impeller 9, as well as a stator 21 developing around the rotor 19 and stationarily housed in the casing 3.

Each impeller 9 is supported on the stationary shaft 5 by means of a respective bearing 31. In the embodiment of FIGS. 1 and 2 each bearing 31 comprises a stationary inner bearing component 31B and an outer rotary bearing component 31A. The two components 31A, 31B are substantially co-axial.

In presently preferred embodiments the bearing 31 is a PCD (Poly-Crystalline Diamond) bearing comprised of radial bearing pads 51A on the rotary outer bearing component 31A and radial bearing pads 51B on the stationary inner component 31B. Each bearing 31 can further include axial bearing pads 53A on the rotary outer bearing component 31A and axial bearing pads 53B on the stationary inner bearing component 31B or on the statoric part 11 of the pump 1.

According to embodiments disclosed herein, the inner bearing component 31B is configured to provide a vibration damping effect, such that vibrations generated by the rotating impeller 9, for instance, are dampened and not propagated, or propagated only in a dampened manner, through the respective bearing 31 towards the stationary structure 11 of the pump 1.

Figure 3:
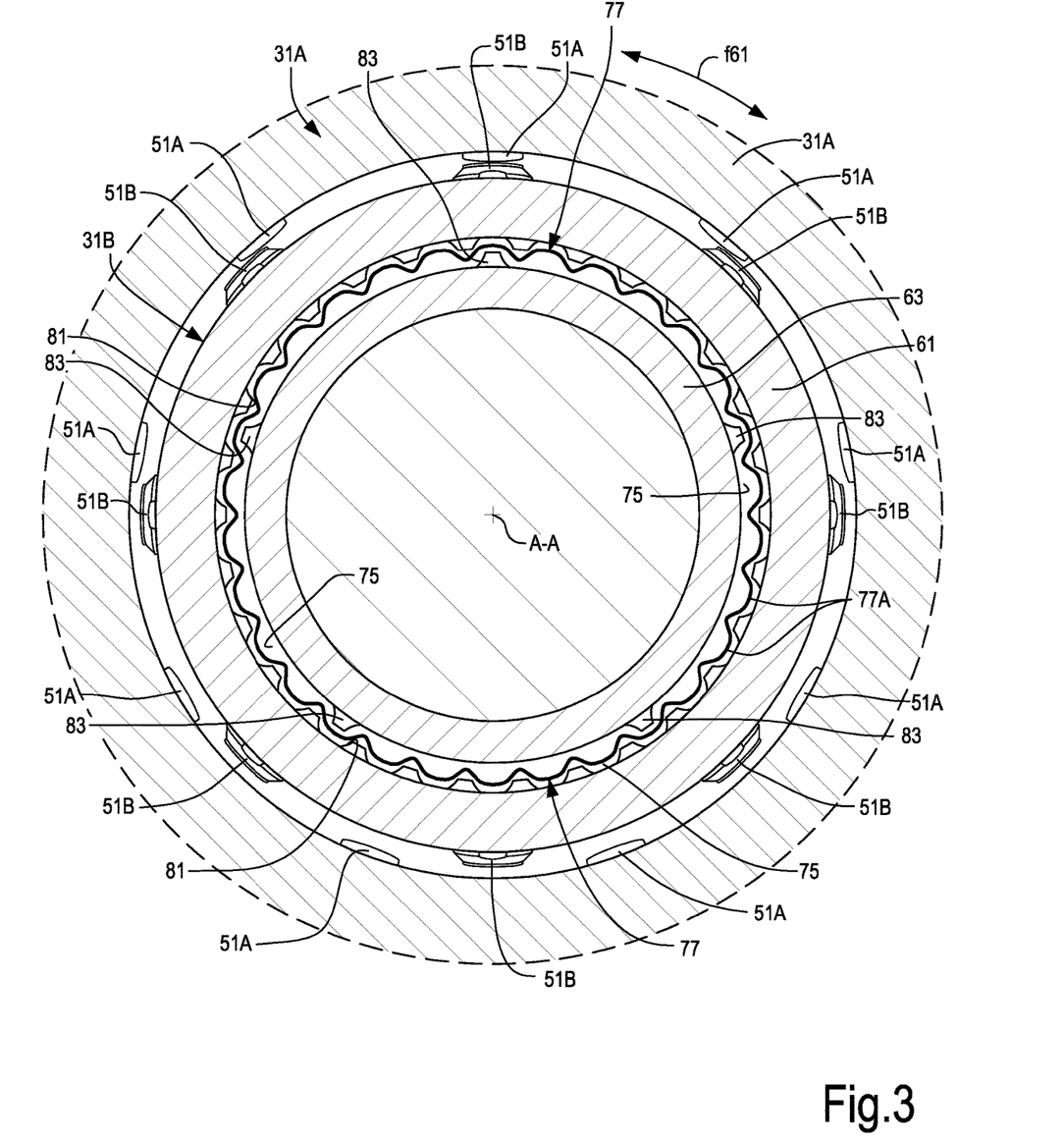
FIG. 3 shows a schematic cross-sectional view of an internal bearing component according to line of FIG. 2.

Referring now to FIG. 3, with continuing reference to FIG. 2, the inner stationary bearing component 31B comprises an external cylindrical member 61 and an internal cylindrical member 63. The internal and external cylindrical members 61, 63 are substantially co-axial to one another and to the stationary shaft 5, on which the internal cylindrical member 63 can be mounted. The bearing pads 51B are integral with the external cylindrical member 61.

The external cylindrical member 61 and the internal cylindrical member 63 can be coupled to one another by a ferrule 65, see FIG. 2, which can be screwed on one end of the internal cylindrical member 63. The opposite end of the internal cylindrical member 63 can form a flange 67. The external cylindrical member 61 can be pressed by screwing the ferrule 65, between the flange 67 and the ferrule 65. O-ring or similar seals 71, 73 can be arranged between the internal cylindrical member 63 and the external cylindrical member 61.

A cylindrical gap 75 is formed between the external cylindrical member 61 and the internal cylindrical member 63. The cylindrical gap 75 extends in an axial direction, i.e. parallel to the rotation axis A-A. In the cylindrical gap 75 a resilient damping feature is arranged. As used herein, the term "resilient damping feature" can be understood as any mechanical device or combination of devices arranged between the external cylindrical member 61 and the internal cylindrical member 63 and coacting therewith, such that the vibration of one said internal and external cylindrical members 63, 61 is not transmitted to the other of said internal and external cylindrical members 63, 61, or a dampened vibration is transmitted thereto.

A lubricant fluid, preferably a lubricant liquid, such as oil or other preferably high-viscosity fluid can fill the gap 75.

In some embodiments, as shown in FIG. 3, the resilient damping feature includes a corrugated tubular sheet 77. The corrugated tubular sheet 77 comprises corrugations 77A extending axially, i.e. parallel to the rotation axis A-A of the bearing 31. Due to the corrugated tubular sheet 77 arranged in the gap 75, the external cylindrical member 61 and the internal cylindrical member 63 can move one with respect to the other to a limited extent in a radial direction, for instance due to oscillations induced by vibrations of the rotary impeller 9. The radial displacement of the external cylindrical member 61 with respect to the internal cylindrical member 63 is obtained through the compliance of the corrugations 77A under a radial load applied thereto. The oscillation in radial direction is dampened by the resilient damping feature, provided by the corrugated tubular sheet 77.

In addition to a radial displacement, the external cylindrical member 61 can also move tangentially with respect to the internal cylindrical member 63, i.e. the two members 61, 63 can rotate with respect to one another by a limited angle. The tangential displacement (arrow f61, FIG. 3) can be limited by tangential displacement limiting devices. For instance said devices can include at least one, and preferably a set of first radial projections 81 extending radially inwardly from an inner surface of the external cylindrical member 61 towards the outer surface of the internal cylindrical member 63. The tangential displacement limiting devices can further include at least one, and preferably a set of second radial projections 83 extending radially outwardly from the outer surface of the internal cylindrical member 63 towards the external cylindrical member 61. The first radial projections 81 and the second radial projections 83 extend between adjacent corrugations 77A, such that the tangential displacement of the internal and external cylindrical members 63, 61 is limited by co-action of the first and second radial projections 81, 83 with the corrugations 77A.

A tangential displacement provoked by vibrations or oscillations induced by the rotary impeller causes flexural deformation of the corrugations 77A of the corrugated tubular sheet 77, which therefore dampens the oscillations.

The damping effect of the resilient damping feature can be improved by high-viscosity lubrication liquid contained in the gap 75 and/or by friction between the resilient damping feature 77 and the surfaces of the external and internal cylindrical members 61, 63 in contact with the corrugations 77A of the resilient damping feature 77.

Figure 4:
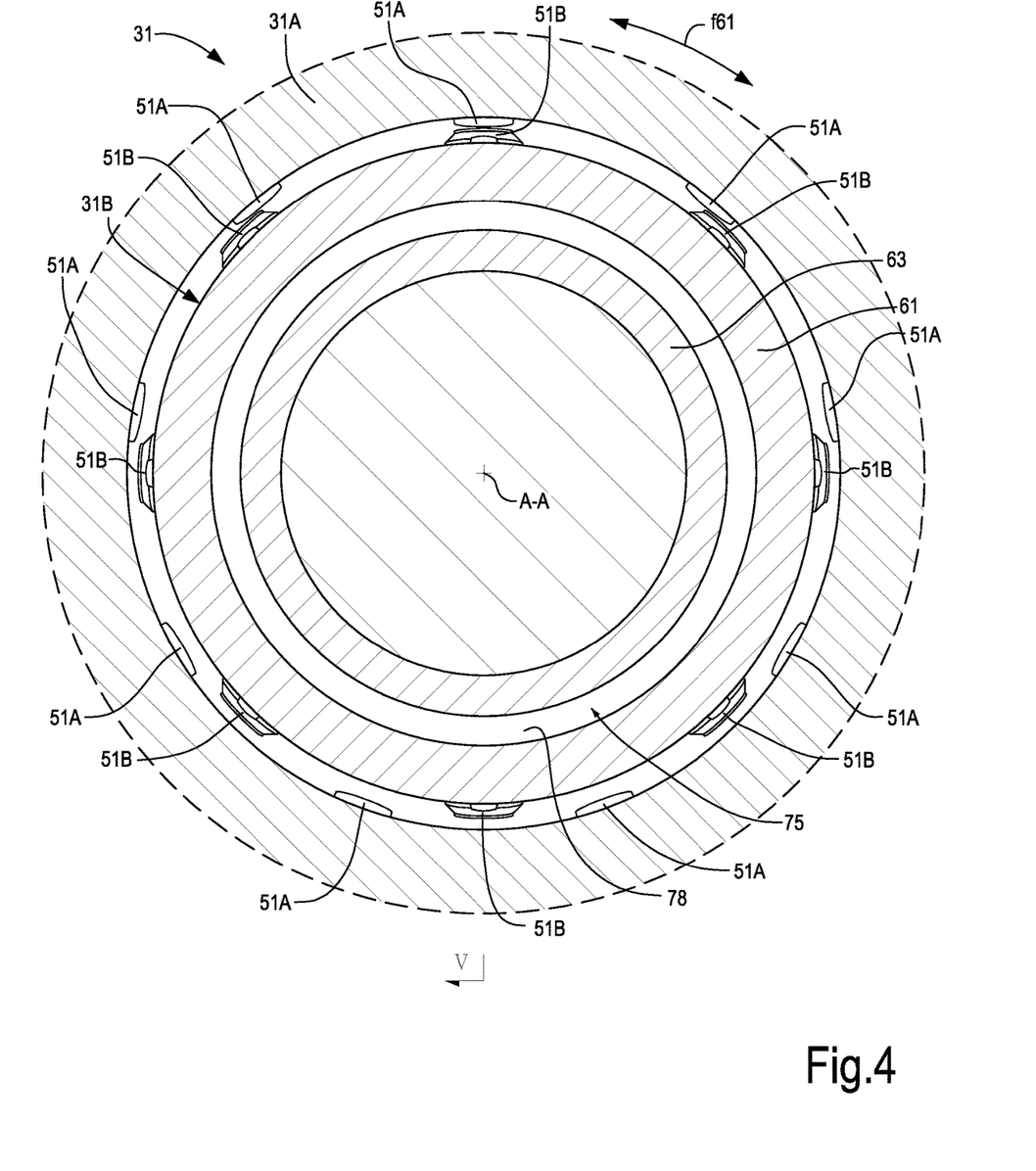
FIG. 4 shows a schematic cross-sectional view of a second embodiment of a bearing according to the present disclosure.
Figure 5:
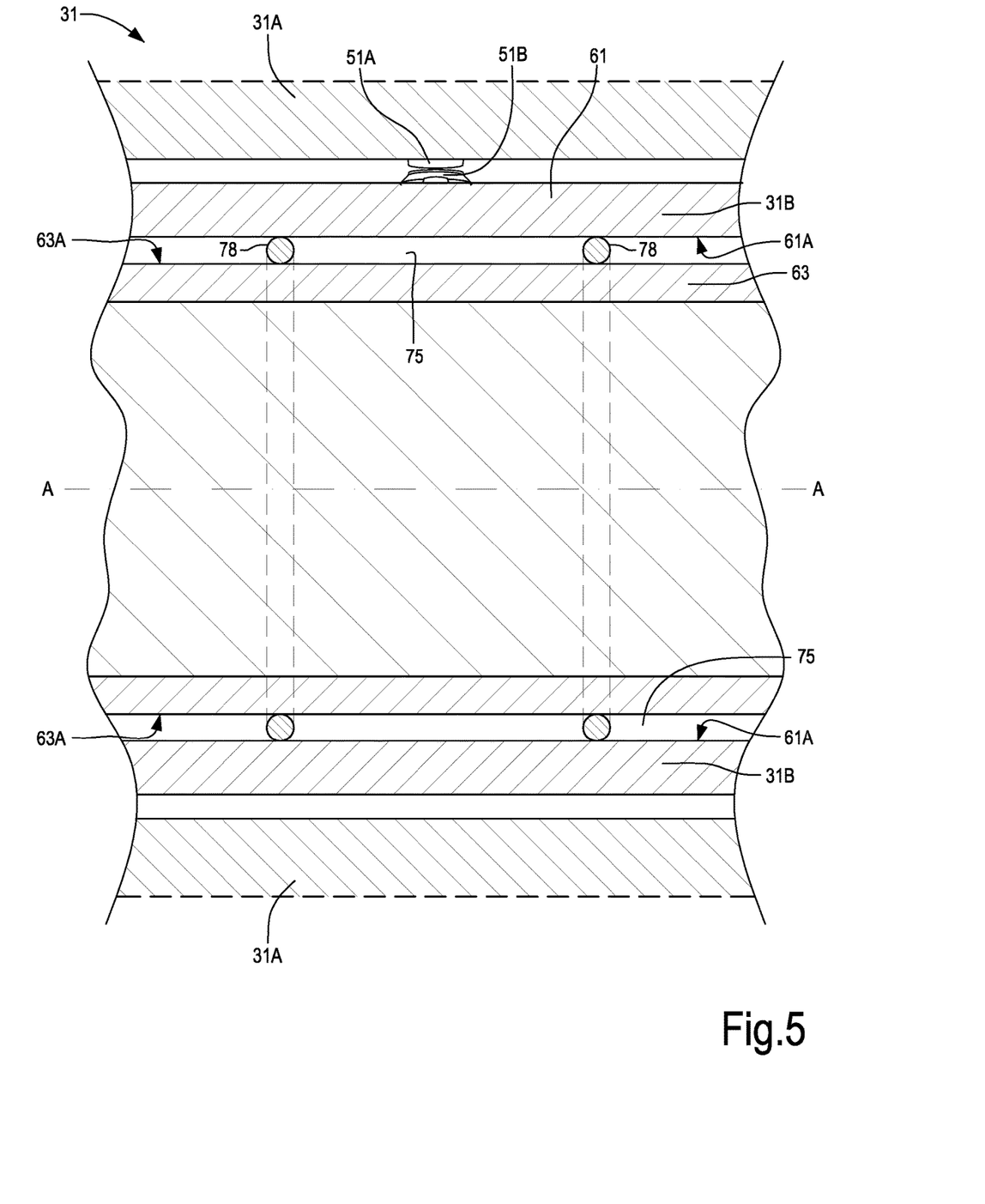
FIG. 5 shows a cross-sectional view according to line V-V of FIG. 4.

Referring now to FIGS. 4 and 5, with continuing reference to FIG. 2, in other, currently less preferred embodiments, the resilient damping feature can include a set of compressible inserts arranged in the gap between the external cylindrical member 61 and the internal cylindrical member 63. In FIGS. 4 and 5 the same or equivalent parts or elements already shown in FIGS. 2 and 3 and described above are labeled with the same reference numbers and are not described again. In the embodiment of FIGS. 4 and 5 the resilient damping feature includes a set of O-rings 78 housed in the gap 75. Annular grooves on the inner cylindrical surface 61A of the external cylindrical member 61 and annular grooves in the outer cylindrical surface 63A of the internal cylindrical member 63 can be provided, to retain the O-rings 78 in the correct position.

Figure 6:
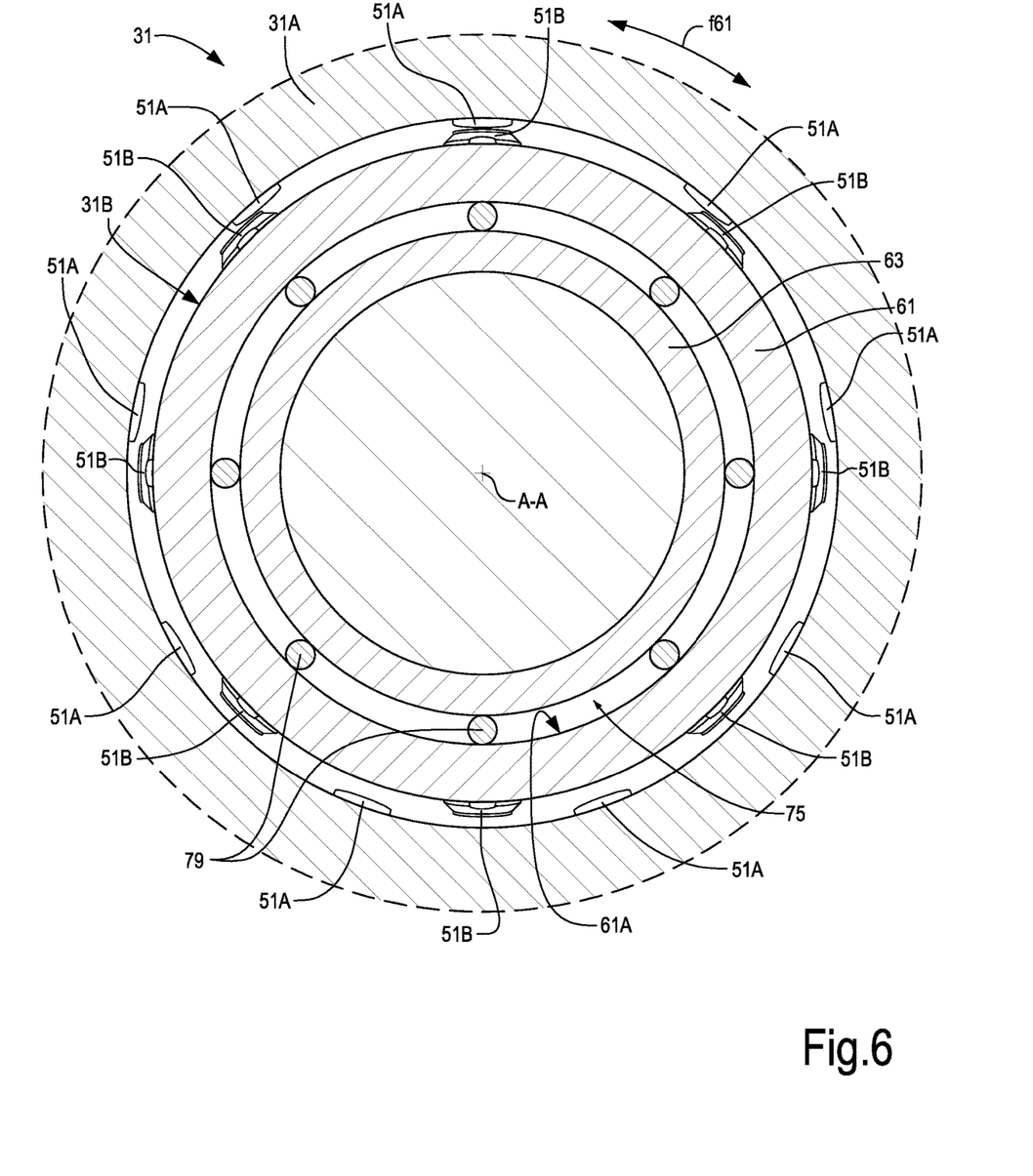
FIG. 6 shows a schematic cross-sectional view of a third embodiment of a bearing according to the present disclosure.

Referring to FIG. 6, with continuing reference to FIG. 2, in yet further, currently less preferred embodiments, the resilient damping feature can include a set of longitudinally extending resilient members 79. In FIG. 6 the same or equivalent parts or elements already shown in FIGS. 2 and 3 and described above are labeled with the same reference numbers and are not described again. The resilient members 79 are housed in the gap 75 and can be retained in position by longitudinal grooves provided in the inner cylindrical surface 61A of the external cylindrical member 61 and longitudinal grooves in the outer cylindrical surface 63A of the internal cylindrical member 63.

While the invention has been described in terms of various specific embodiments, it will be apparent to those of ordinary skill in the art that many modifications, changes, and omissions are possible without departing form the spirit and scope of the claims. In addition, unless specified otherwise herein, the order or sequence of any process or method steps may be varied or re-sequenced according to alternative embodiments.

The invention claimed is:

1. A bearing component, comprising:
an external cylindrical member having an outer bearing surface and an inner cavity;
an internal cylindrical member arranged in the inner cavity and coaxial to of the external cylindrical member to form a gap therebetween; and
a resilient damping feature arranged in the gap, the resilient damping feature comprising, a corrugated tubular sheet disposed in the gap; and
projections extending from both the internal cylindrical member and the external cylindrical member.

2. The bearing component of claim 1, further comprising:
bearing pads on the outer bearing surface of the external cylindrical member.

3. The bearing component of claim 1, further comprising:
bearing pads on the outer bearing surface of the external cylindrical member, wherein the bearing pads are polycrystalline diamond pads.

4. The bearing component of claim 1, wherein the corrugated tubular sheet is made of metal.

5. The bearing component of claim 1, wherein the corrugated tubular sheet comprises corrugations extending parallel to an axis of the external cylindrical member and of the internal cylindrical member.

6. The bearing component of claim 1, wherein the gap is filled with a lubricant liquid.

7. A bearing, comprising:
an inner bearing component according to claim 1; and
an outer bearing component,
wherein said outer bearing component and said inner bearing component are arranged coaxially to one another and adapted to rotate one with respect to the other around an axis of the bearing.

8. The bearing of claim 7, wherein the outer bearing component has an inner cylindrical bearing surface provided with a plurality of bearing pads co-acting with bearing pads on the outer bearing surface of the inner bearing component.

9. A rotary machine, comprising:
a stationary shaft and a rotor supported for rotation on the stationary shaft,
wherein the rotor is supported on the stationary shaft by at least one bearing according to claim 7.

10. A rotodynamic pump, comprising:
a casing;
a stationary shaft arranged in the casing; and
at least one rotary impeller arranged for rotation on the stationary shaft by at least one bearing according to claim 7.

11. A bearing component, comprising:
an external cylindrical member having an outer bearing surface and an inner cavity;
an internal cylindrical member, arranged in the inner cavity of the external cylindrical member and substantially coaxial thereto,
wherein the external cylindrical member and the internal cylindrical member form a gap therebetween,
wherein a resilient damping feature is arranged in the gap,
wherein the resilient damping feature includes a corrugated tubular sheet arranged in the gap between the external cylindrical member and the internal cylindrical member,
wherein the corrugated tubular sheet comprises corrugations extending parallel to an axis of the external cylindrical member and of the internal cylindrical member, and
wherein the inner cavity of the external cylindrical member has first radial projections extending inwardly from a surface of the inner cavity towards the corrugated tubular sheet, the internal cylindrical member has second radial projections extending outwardly towards the external cylindrical member, and the first radial projections and the second radial projections co-act with the corrugations of the corrugated tubular sheet to limit angular displacement of the external cylindrical member with respect to the internal cylindrical member.

* * * * *